United States Patent [19]

Way

[11] 4,005,898
[45] Feb. 1, 1977

[54] CONVERTIBLE SEAT/BED STRUCTURE AND ASSOCIATED FOLDABLE TABLE FOR PICKUP TRUCKS AND THE LIKE

[76] Inventor: Lee V. Way, Rte. 3, Box 333C, Wilmington, N.C. 28401

[22] Filed: Mar. 18, 1975

[21] Appl. No.: 559,568

[52] U.S. Cl. .............................. 296/23 R; 5/18 R; 108/36; 108/48; 108/112; 108/117; 108/130; 296/69

[51] Int. Cl.² .......................................... B60P 3/34

[58] Field of Search ............. 296/69, 66, 65 R, 63, 296/1 D, 23 R; 5/114, 118, 13, 12 R, 17, 18, 29; 108/44, 48, 36, 112, 113, 130, 131, 160; 248/188.6, 439; 297/16, 55, 65, 66, 118

[56] References Cited

UNITED STATES PATENTS

| 185,382 | 12/1876 | Arnold | 108/131 |
|---|---|---|---|
| 1,165,991 | 12/1915 | Maggs | 108/160 |
| 1,355,005 | 10/1920 | Schechter | 296/16 |
| 1,544,959 | 7/1925 | Wasmuth | 108/112 |
| 3,600,033 | 8/1971 | Holdampf | 297/16 |
| 3,833,253 | 9/1974 | Butler | 296/69 X |
| 3,866,548 | 1/1975 | Skonieczny | 108/48 X |
| 3,910,626 | 10/1975 | Hobbensiefken | 296/69 |

FOREIGN PATENTS OR APPLICATIONS

| 1,025,246 | 1/1953 | France | 296/65 R |

Primary Examiner—Robert J. Spar
Assistant Examiner—Donald W. Underwood
Attorney, Agent, or Firm—B. B. Olive

[57] ABSTRACT

A foldable, convertible structure is adapted to be removably mounted on the inside wall of a pickup truck, van, etc., and is unfoldable into a seat for sitting purposes and is further unfoldable into a bed for sleeping purposes. When folded, the structure resides in a plane parallel to the inside side wall of the vehicle to be used for hauling purposes. Such structure may be used singly or in pairs. An associated foldable table is removably mounted on the cab wall of the truck and can be unfolded for use with the seat structure.

11 Claims, 18 Drawing Figures

CONVERTIBLE SEAT/BED STRUCTURE AND ASSOCIATED FOLDABLE TABLE FOR PICKUP TRUCKS AND THE LIKE

BACKGROUND OF THE INVENTION

1. Field of the Invention

This invention relates to foldable, convertible structures for use with pickup trucks, vans, etc., and more particularly to removable, foldable, convertible seat/bed structures adapted for use on such vehicles and which have an associated foldable table structure.

2. Description of the Prior Art

Heretofore, in order to sit in the back of a pickup truck, a wooden bench was placed in back of the truck. Such seats were and still are used for transporting workers from job site to job site. Occasionally, when the vehicle owner knew that such a seat would be used daily, he would fabricate and weld such a seat into place directly to the vehicle body. However, when it became desirable to haul materials, etc., in the truck, these permanent seats interferred with loading and unloading and consumed valuable cargo space.

Those persons who have converted their trucks into campers by adding shell top structures have found a need for both seating and sleeping arrangements as well as for a table usable with the seating arrangements.

Illustrative prior art patents directed to seat, bed and table arrangements on trucks, campers and automobiles include U.S. Pat. Nos. 3,140,114; 3,188,134; 3,246,347; 3,317,238; 3,473,840; 3,675,965; 3,727,970; and 3,833,253.

Considering what is presently available on the market, there is a pressing need, particularly for pickup trucks, for a combination bed, seat and table structure which can be folded for storage, unfolded for use or completely removed when the pickup truck is needed for its normal use.

SUMMARY OF THE INVENTION

The present invention is illustrated for use with a pickup truck and provides a foldable, convertible frame structure which is usable either singly or in pairs and is removably and slidably mounted on a support structure which in turn is secured to the inside sidewall of the truck. In one unfolded position, the structure provides a seat and back structure and in a still further unfolded position provides a bed structure. The entire frame structure is removable from the truck with the exception of the support structure which remains secured to the inside truck sidewall and in a manner designed to avoid interference with loading and hauling of other materials or products.

The bed/seat structure which mounts on the wall secured support structures includes foldable seat and seat back frames, appropriate hinge means for the seat and seat back frames, means for locking the structure in position once unfolded, and folding leg means for supporting the structure on the truck bed. The bed/seat structure may be used singularly with one such unit mounted to the back of the truck cab so that persons using the unit as a seat face the rear of the truck or such a unit may be mounted on one side of the truck with the seated persons facing the other side of the truck. In the preferred embodiment, a pair of such units are mounted in opposed fashion on the inside side walls of the truck so that persons sitting thereon are facing each other and so that when the units are opened fully into the bed position, the units form a bed which covers the entire width of the truck bed.

When other uses of the truck are needed, the entire unit or units can be lifted from the truck and placed in a storage area and the truck bed used for hauling purposes. In conjunction with the seat-bed units, a foldable table and frame structure is provided and which mounts on the cab back wall. This table structure unfolds to an appropriate height to reside between a pair of the seat/back units and provides a sitting and eating surface but which can be folded back when not needed or when the bed is needed.

DESCRIPTION OF THE PREFERRED EMBODIMENT

FIGS. 4, 5, 6 and 7 are first referred to for a description of the support structure 11 used with the foldable seat/bed frame structure or unit 10 of the invention. Such support structure 11 is intended to be permanently secured to an inside truck wall and to provide a means for removably mounting one of the seat/bed units 10. A pair of structures 11 are used for two units 10.

Structure 11 is composed of a support plate 12 which is a relatively, flat, thin metal plate having a bent outwardly turned lower end portion 13. A pair of thin metal L-shaped brackets 14, 15 are employed to secure support plate 12 and its lower end portion. Bracket 14 has a bent end portion 16 which attaches to inside sidewall 17 of truck 18 (see FIG. 5). Portion 16 is secured in place by a pair of screws 19, 20 which pass through holes 21, 22 and fasten into sidewall 17. Bracket 15 has a bent end portion 26 secured by a pair of screws 27, 28 to the top of tire well 25. The bent lower end portion 13 of support plate 12 is secured to bracket 14 by screws 29, 30 which pass through mating holes in bent portion 13 and in bracket 14 as indicated in FIG. 6. Bracket 15 is secured to support plate 12 by screws 31, 32 which pass through holes 33, 34 in back support plate 12 and through holes 35, 36 in bracket 15. A pair of vertical supports 40, 41 are composed of a pair of rectangular plate members 42, 43 respectively and a pair of vertical U-channel members 44, 45 respectively. U-channel members 44, 45 are integrally secured to plate members 42, 43 respectively preferably by weldig and provide means for removably securing the bed/seat unit, as later explained. Each member 44, 45 has an open top and closed bottom.

Plate members 42, 43 each have three holes 46, 47, 48 and 49, 50, 51 respectively. Holes 46, 47, 48 align with holes 52, 53, 54 in support plate 12 and holes 49, 50, 51 align with holes 55, 56 57 also in support plate 12 but at the opposite end thereof. A rivet 60 extends through holes 47 and 53 and is pressed or hammered to flatten the free end. By being riveted at its center, vertical support 40 can thus rotate inwardly toward vertical support 41 and about rivet 60. Rivet 61 likewise serves the same purpose for vertical support 41 by passing through holes 50 and 56 and being pressed or hammered to flatten its free end and enabling support 41 to pivot inwardly toward support 40 and about rivet 61. Screws 62, 63 are threadably received by holes 46, 52, and 48, 54 respectively. When is place, screws 62, 63 maintain vertical support 40 in an upright position. By removing screws 62, 63, vertical support 40 is then free to pivot about rivet 60. Screws 64, 65 are threadably received by holes 49, 55 and 51, 57 respectively. When in place, screws 64, 65 maintain vertical support 41 in an upright position. By removing screws 64, 65, vertical support 41 is then free to pivot about rivet 61. For normal use, supports 40 and 41 are vertically secured whereas when the bed/seat unit is not being used, the respective screws can be removed and vertical supports 40, 41 can be rotated inwardly to bring them below the level of the truck sidewall 17. Once support structure 11 is completely assembled as described, it is secured as an assembly to the inwardly turned upper portion 23 of sidewall 17 of truck 18 and is made secure to sidewall portion 23 by screws 66, 67, 68, 69, 70, 71 (see FIG. 4) which screw into such sidewall portion 23 of truck 18. Thus, when completely assembled and installed on the truck 18, support structure assembly 11 is held by screws 19, 20, 27, 28, 66, 67, 68, 69, 70 and 71.

Figure 1:
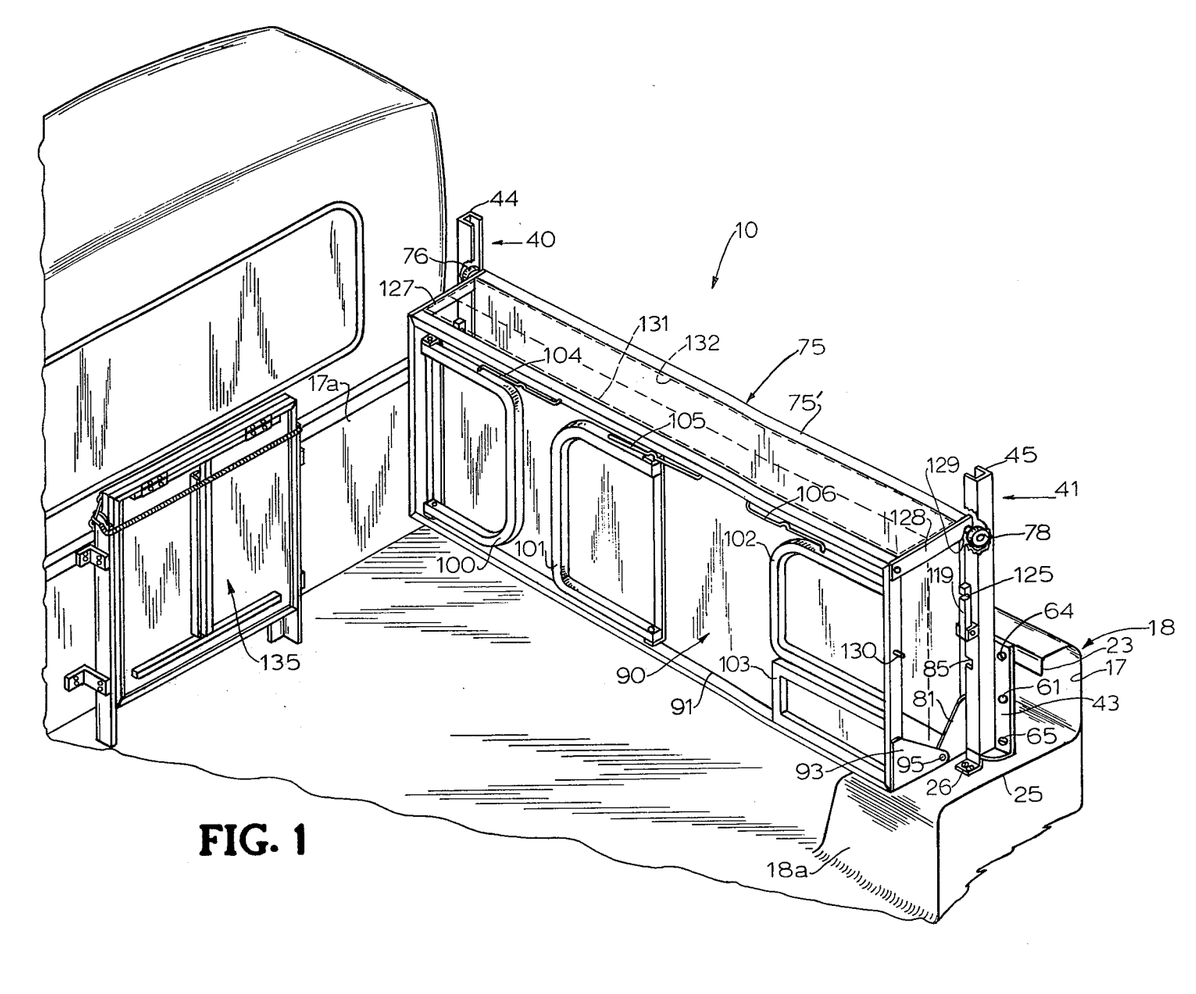
FIG. 1 is a fragmentary pictorial view of the foldable/convertible seat/bed as it appears in a folded position within a truck along with the folded table structure and with cushions indicated by dashed lines.
Figure 5:
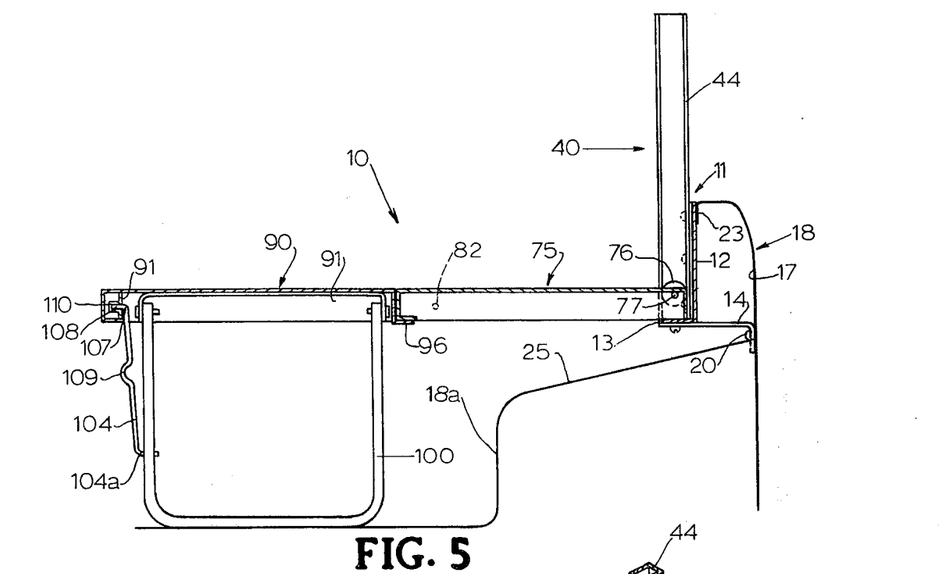
FIG. 5 is an enlarged elevation section view of the seat/bed unit as unfolded in FIG. 4 and taken substantially along line 5—5 of FIG. 4.
Figure 6:
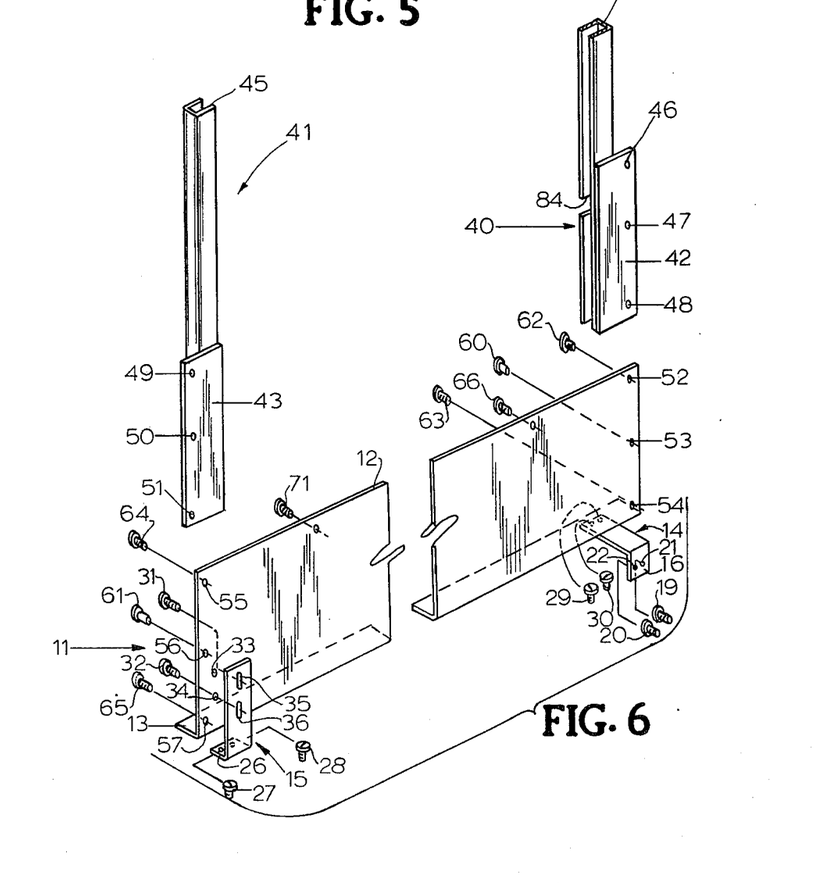
FIG. 6 is an enlarged, exploded, fragmentary, pictorial view illustrating the seat/bed unit back support structure.
Figures 7, 8, 9:
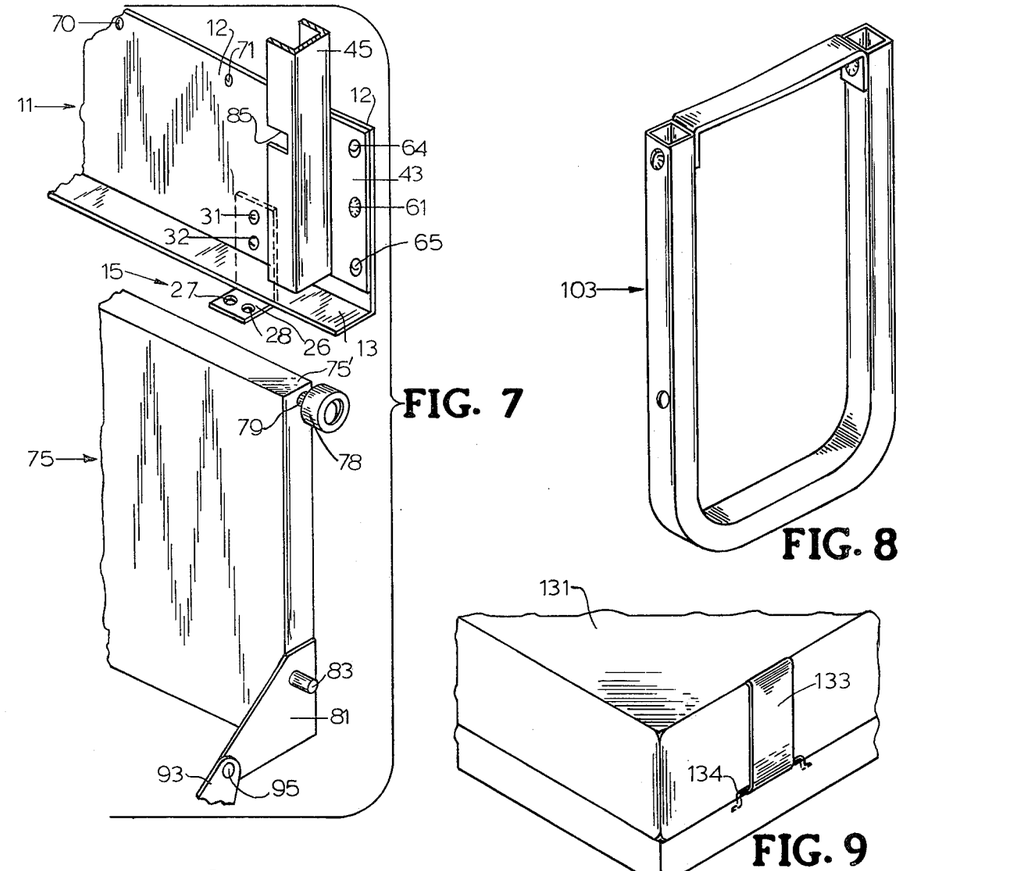
FIG. 7 is a fragmentary, pictorial, enlarged view of the seat/bed unit back support structure and the seat back along with a portion of the hinging means.
FIG. 8 is an enlarged pictorial view of an auxiliary leg used with the seat/bed unit.
FIG. 9 is an enlarged, fragmenatary, pictorial view illustrating a means of attaching cushions to the seat and seat bck structures.

Referring now particularly to FIGS. 1, 5 and 7, a rectangular seat back or frame member 75 extends between vertical supports 40, 41. Member 75 in the embodiment being described is formed from channel members arranged as a rectangular frame and covered with a thin metal sheet. On the uppermost end corners of frame member 75 there is mounted a pair of rollers 76, 78. Roller 76 is rotatably mounted on a horizontal shaft 77 which is secured to one outer end corner of frame member 75 and roller 78 is rotatably mounted on a horizontal shaft 79 on an opposite outer end corner of frame 75. Both rollers 76 and 78 are preferably mounted so that the outermost peripheral surfaces thereof are even with or extend slightly above the top surface 75' (FIG. 2) of frame or back member and are of a diameter sufficient to provide a snug yet rollable relation within the vertical U-channel members 44, 45. Rollers 76, 78 are thus adapted for riding up and down within the U-channel members 44, 45 to provide vertically guided, rolling and pivotal support for frame or back member 75.

Figure 2:
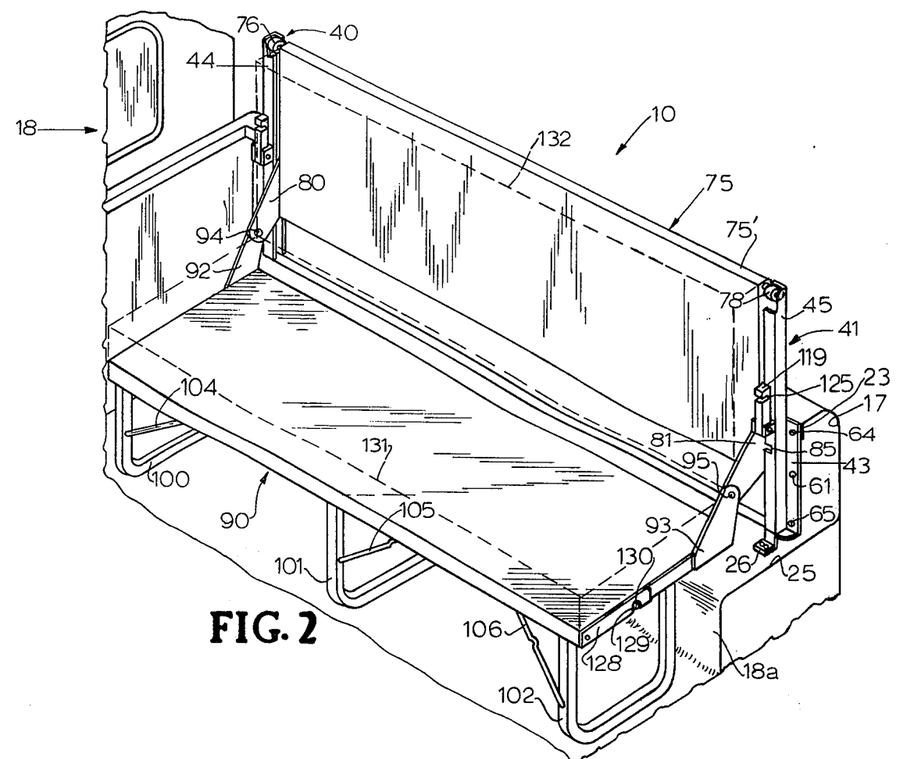
FIG. 2 is a view similar to that of FIG. 1 with the seat/bed unit unfolded into an upright sitting position and with cushions indicated by dashed lines.
Figure 3:
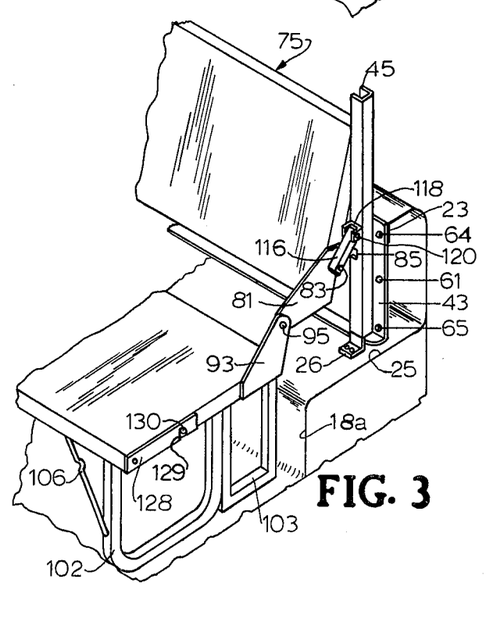
FIG. 3 is a fragmentary pictorial view of a portion of the FIG. 2 apparatus and illustrating a reclined sitting position.
Figure 4:
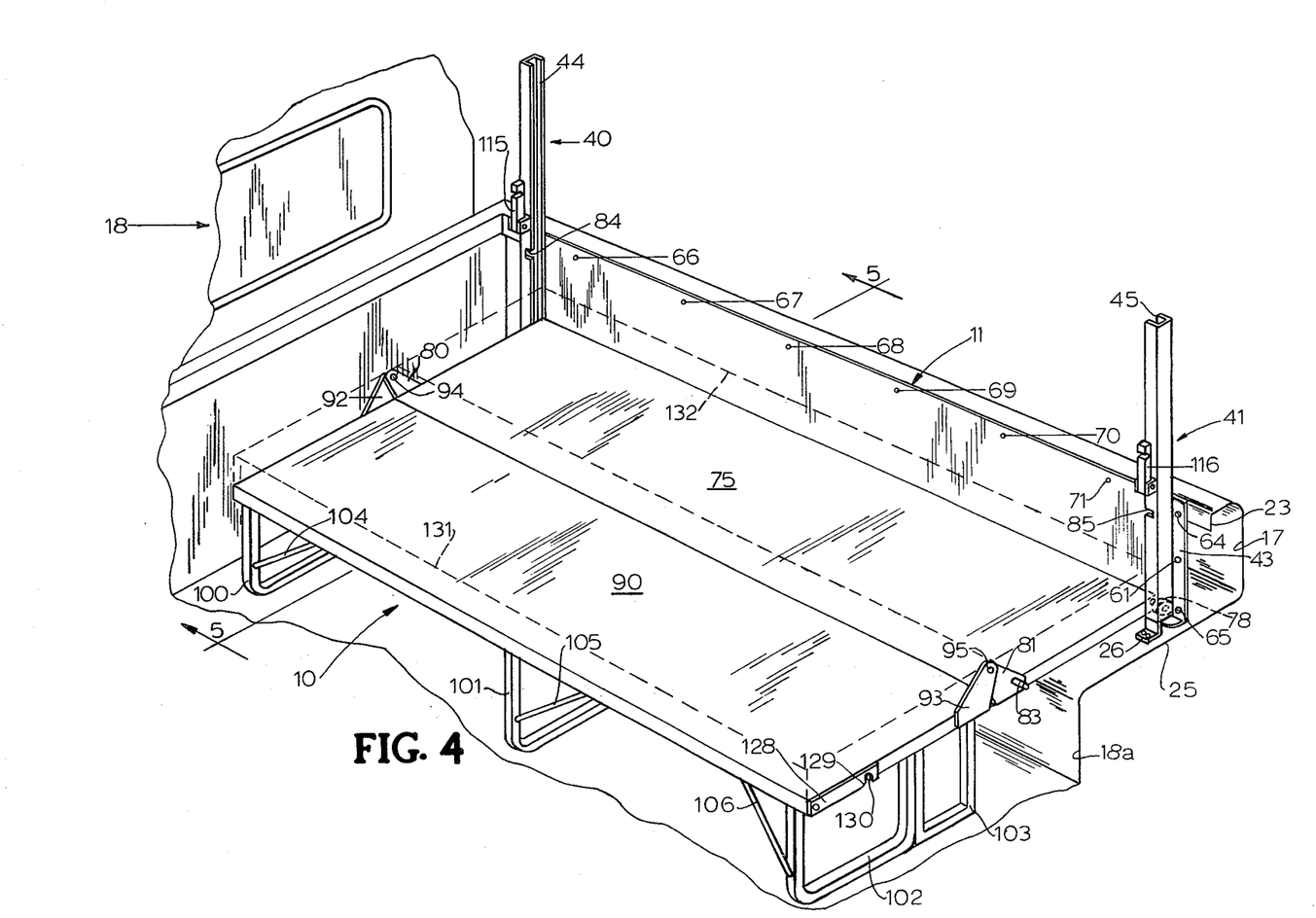
FIG. 4 is a view similar to that of FIG. 2 with the seat/bed unit fully unfolded into a bed unit and with cushions indicated by dashed lines.

The inner end corners of frame 75 mount hinge arrangements. In this regard, a hinge portion 80 is integrally secured to frame 75 at one inner end corner and a hinge portion 81 is integrally secured to frame 75 at another inner end corner. FIGS. 1, 2, 4 and 7 best illustrate this relationship. A hinge pin 82 is made integral with hinge portion 80 and extends outward therefrom and is adapted to pass through a mating slot 84 in U-channel member 44 whenever frame 75 is being positioned as illustrated in FIGS. 2 and 3. Pin 82 can thus be passed in and out of slot 84 without roller 76, which is on the same end of frame 75, sliding out of U-channel member 44. Similarly, a pin 83 is made integral with hinge portion 81 and extends outward therefrom and is adapted to pass through a slot 85 in U-channel member 45. Like pin 82, pin 83 can be passed in and out of its mating slot 85 without roller 78 sliding out of U-channel member 45. For seating and folded storage positioning, seat back or frame member 75 can thus be guided up and down between U-channel members 44, 45 by rollers 76, 78 and pins 82, 83 riding within U-channel members 44, 45. For other positioning purposes, as illustrated in FIGS. 3, 4 and 5, pins 82, 83 may leave the respective U-channel members 44, 45 which enables frame or back member 75 to assume an inclined (FIG. 3) or horizontal position (FIG. 4).

A seat or frame member 90 is hinged to frame 75, as later explained, and is designed to be stored vertically (FIG. 1) or to work in cooperation with seat back member 75 in a horizontal position to provide a practical yet comfortable seat (FIGS. 2 and 3) or bed (FIG. 4) for use with truck 18. Seat frame member 90 is formed like the back frame member 75 and includes a thin metal sheet pre-bent into its preferred shape and secured to a rectangular frame formed by channels 91 (FIG. 1). A pair of hinge portions 92, 93 are secured to the inner end corners of seat frame 90 and are adapted to mate with hinge portions 80, 81 and are united into pairs, e.g., 80 and 92, 81 and 93, by pivot pins 94, 95 respectively to provide a hinged and pivotal connection between the respective inner edges of back frame 75 and seat frame 90. Such pivotal connections however can be seen in the drawings to be offset from the respective frame surfaces which enables the frames to be spaced apart for vertical storage as in FIG. 1, to be spaced in a perpendicular relation for seating as in FIG. 2 in which the lower edge of frame 75 is positioned vertically above and somewhat behind the inner edge of frame 90, to be spaced in an angular seating relation as in FIG. 3 or in a horizontal coplanar relation as in FIG. 4 in which the respective inner edges of back frame 75 and seat frame 90 are brought together in an abutting relation. For purposes of this last bed position, seat member 90 is provided with a bent edge flange 96 which receives and supports the inner edge of back frame member 75 as best illustrated in FIG. 5. Rollers 76, 78 support the opposite edge.

FIGS. 1, 2, 3, 4 and 5 illustrate legs 100, 101, 102 and 103 which fold into a flat relationship beneath seat frame 90 and nest within the frame channels 91. Legs 100, 101 are substantially the width of seat frame 90 and when unfolded provide support either for the seat positions as in FIGS. 2 and 3 or for the bed position as in FIG. 4. Leg 102 is smaller in width and accommodates the conventional truck wheel well 18a as in the FIG. 2 seat position for which leg 102 provides adequate support. For the alternate seat position illustrated in FIG. 3 or the bed position illustrated in FIG. 4, an additional support is provided by leg 103. Thus, the leg arrangements accommodate to each of the three positions and to conventional tire well, floor and sidewall configurations of the typical pickup truck.

Figure 10:
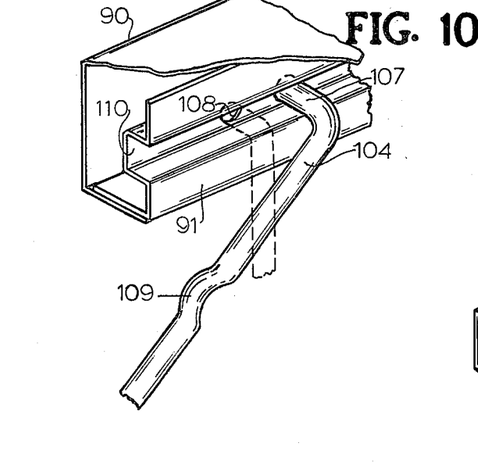
FIG. 10 is a fragmentary, pictorial view of one of the leg support braces and illustrating its folding and locking arrangements.

Added stiffness for both seating and bed purposes is provided by bracing rods 104, 105 and 106, which as illustrated in FIGS. 1, 2, 3, 4, 5 and 10 are pivotally mounted on their respective legs and are arranged to be latched in corresponding holes provided in the support channels 91 of frame 90. Bracing rod 104, for example, is illustrated in FIG. 10 as having a bent end portion 107 which is received by a hole 108 in one of the support channels 91 forming part of frame 90. In this illustrative example of the bracing rod arrangement, rod 104 snaps into hole 108, in channel 91, to hold leg 100 in a supporting position. In the closed position, rod 104 is pulled out of hole 108 and is made to slide away from hole 108 until bend 109 can come opposite the slot portion 110 of channel 91 and secure rod 104 by bend 109 snapping into slot 110 in channel 91. Rod 104 is, of course, secured at one end to leg 100 and is bent in such manner as to cause its opposite end to snap into hole 108 for support and for bend 109 to snap into slot 110 for storage. While only support leg 100 and brace rod 104 have been described, it should be understood that legs 101 and 102 and rods 105 and 106 are similarly constructed and perform the same function and in the same manner.

While the seat/bed embodiment shown is based on use with a truck 18 which has an 8 foot truck bed length, it is equally adaptable for use with a truck 18 which has a 6 foot truck bed length and differently positioned wheel well 18a. For such application, legs 102, 103 would be positioned to the central position illustrated by leg 101 in FIG. 1, and leg 101 would be positioned to the outer position, illustrated by legs 102, 103 in FIG. 1. Of course, where the truck or camper body space is unencumbered with inward protrusions such as wheel wells, all of the support legs may be like legs 100 and 101.

Figure 11:
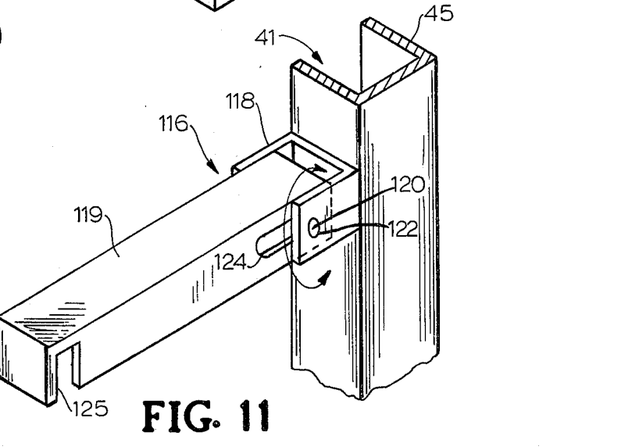
FIG. 11 is an enlarged fragmentary pictorial view of a lock apparatus associated with the reclining position of FIG. 3.
Figure 12:
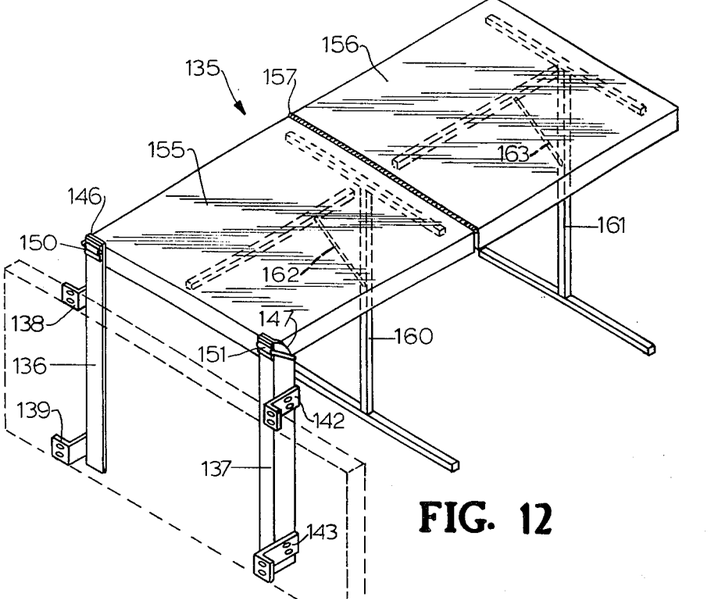
FIG. 12 is a pictorial view of the associated foldable table structure and illustrated in an unfolded position.

Referring particularly to FIGS. 3 and 11, a pair of similarly constructed brackets 115, 116 are pivotally mounted on the respective vertical support members 40, 41. Bracket 116 is shown in FIG. 11 as being made up of a U-member 118 which is welded to vertical support member 41 and an arm member 119 which is pivotally mounted on U-member 118 by means of a pin 120 which passes through slot 124 in arm member 119 and rotates within hole 122 provided in U-member 118. When arm 119 is rotated into a vertical position parallel to upright member 41, arm 119 slides on pin 120 because of slot 124 and effectively resides in a retained vertical position. The end of arm 119 opposite U-member 118 has a slot 125 therein of a predetermined depth and which is adapted to receive hinge pin 83 therein. An identical arrangement exists for bracket 115 which is pivotally mounted on vertical support member 40. From FIG. 3, it can thus be seen that if a slightly reclined position is desired for a more comfortable riding position, then arm 119 and its counterpart for bracket 115 are rotated from their vertical position until the slots in the arms pass over their respective pin, i.e., pins 83 and 82. FIG. 11 clearly portrays this operation for slot 125 and pin 83 and once bracket 116 is so positioned the downward force of seat back 75 effectively maintains seat back 75 in a reclined comfortable travel position.

The bed/seat structure 10 as illustrated in FIG. 1 is in a folded non-usable position and is held in this position by latch members 127, 128 which are pivotally mounted on the outer corners of seat frame 90 and are designed with slots 129 (FIG. 1) designed to engage the roller shafts 77, 79 respectively to hold the frames in a folded position as in FIG. 1. In order to place the structure into a seat position, latch members 127, 128 are removed from their locked position as shown in FIG. 1 and are disengaged from the respective shafts 77, 79 which allows seat frame member 90 to pivot away from back frame 75. The hinge pivot pins 94, 95 provide for this rotation. Assuming that the FIG. 2 seat position is desired, legs 100, 101, 102 are placed into an operative position and seat frame 90 is allowed to continue its unfolding until legs 100, 101, 102 reside on the truck bed. Latches 127, 128 are rotated down parallel with the sides of seat frame 90 and are supported on pins 130 (one being shown in FIG. 2) so that they are out of the way. Structure 10 is now usable as a seat with seat back frame 75 residing in a substantially vertical relationship. For periods of prolonged travel, it is desirable to allow seat back frame 75 to reside in a slightly reclined position thereby giving a more relaxed sitting position. FIG. 3 illustrates such a reclined position and this is achieved by raising seat back 75 so that while rollers 76, 78 ride up in their respective U-channels 44, 45 and pins 82, 83 are allowed to slide out of U-channels 44, 45 through the respective slots 84, 85. With legs 100, 101, 102 in an unfolded position and resting on the truck bed, brackets 115, 116 are placed into use by rotating them forward until they latch with pins 82, 83 and effectively lock structure 10 into a reclined seat position as seen in FIG. 3.

In order to further unfold structure 10 into a bed position, brackets 115, 116 are released from their latching position on pins 82, 83 and are rotated into a vertical locked position against the respective channels 44, 45. Seat structure 10 is then pulled into an unfolded position by pulling seat frame 90 out and this allows seat back frame 75 to move downward with rollers 76, 78 riding downward within U-channels 44, 45 until they reach their lowermost position. Auxiliary leg 103 is now unfolded so as to provide additional support for structure 10 adjacent truck wheel well 18a. While only one unit is shown on FIG. 4, it should be clear that when a pair of seat/bed structures 10 are employed in opposed relation on either side of truck 18, they can be unfolded into a bed which reaches the complete width of truck 18. When completely unfolded, a pair of such seat frame members 90 are brought into an abutting relation to form a continuous and essentially smooth bed. For further comfort, FIG. 9 illustrates application of seat and back cushions 131, 132 to foldable, convertible seat/bed structure 10. A strap 133 receives a spring clip 134 into holes in seat and back members 75, 90.

It has been found through use that when seat/bed structure 10 is used in trucks with shell tops for camper purposes, it is often desirable to have some type of table means which can be used when the seat/bed structure 10 is used as a seat. Referring now specifically to FIGS. 1 and 12–18, an associated foldable table structure 135 is adapted for integral mounting on the back inside wall of the truck bed. Referring particularly to FIG. 14, a pair of support post members 136, 137 are shown integrally mounted on inside back wall 17a of truck 18 and are formed of angle strip. Post member 136 has a pair of brackets 138, 139 secured to member 136 by screws 140 and which in turn are secured to wall 17a by screws 141. Likewise, post member 137 is secured to wall 17a by brackets 142, 143 with screws 144 securing brackets 142, 143 to member 137 and screws 145 securing brackets 142, 143 to wall 17a.

Figure 13:
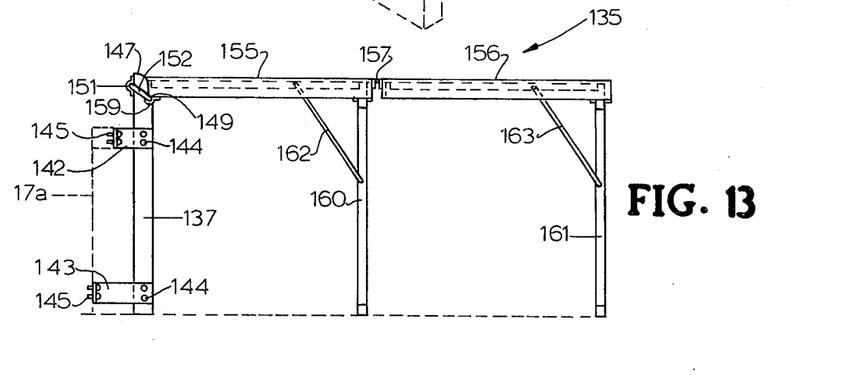
FIG. 13 is a side elevation view of the FIG. 12 structure.
Figure 14:
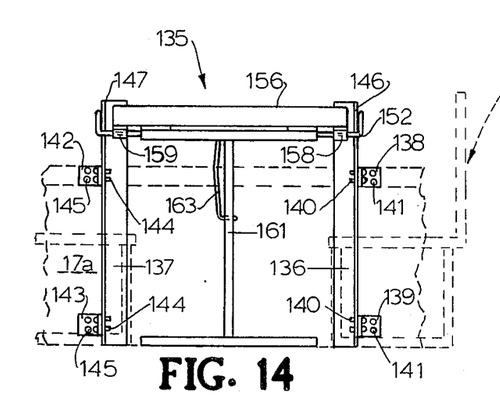
FIG. 14 is an end elevation view of the FIGS. 12 and 13 structure and with the bed/seat assemblies in dashed lines.
Figure 15:
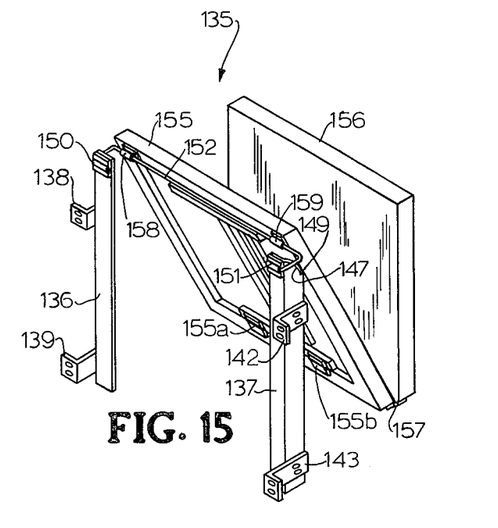
FIG. 15 is a pictorial view of the foldable table structure in a partially collapsed position.
Figure 17:
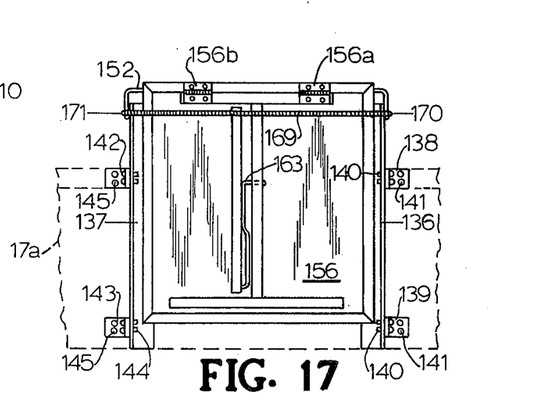
FIG. 17 is an end elevation view of the table structure in a completely collapsed and folded position.
Figure 18:
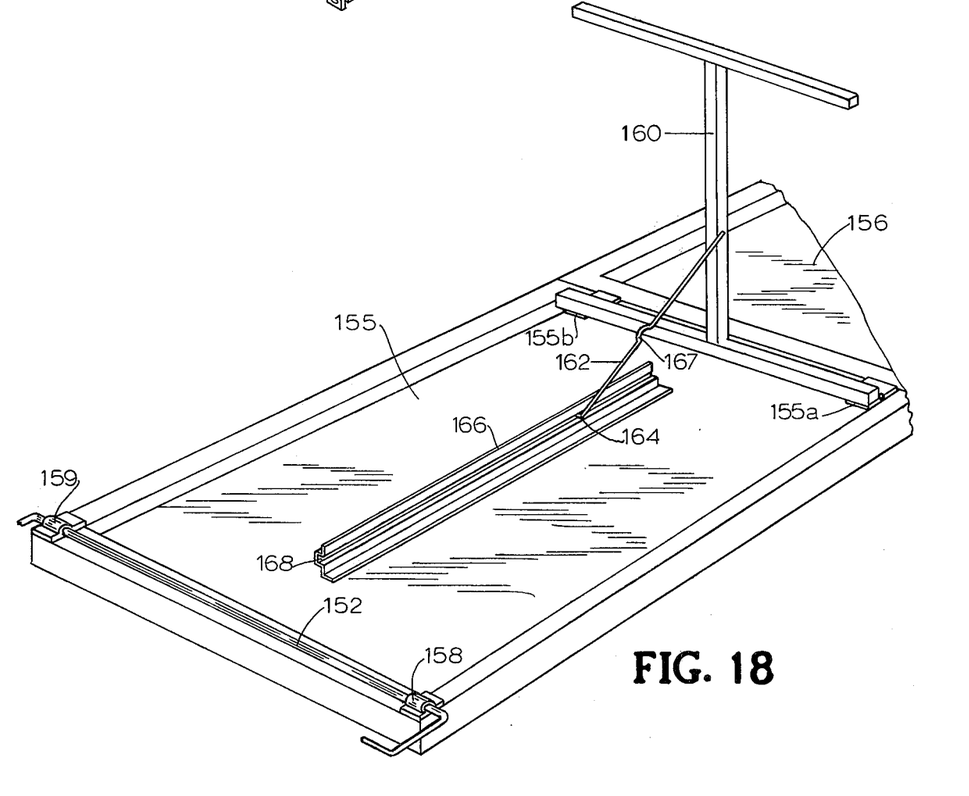
FIG. 18 is a bottom, pictorial view of a portion of the table frame and particularly disclosing the leg locking arrangement.

Post members 136, 137 each have respective top rounded portions 146, 147 and respective notched surfaces 149 extending from the respective bases of the rounded portions 146, 147 as seen in FIGS. 13, 14 and 15. A cap 150 is integrally secured to post member 136 and a similar cap 151 is integrally secured to post member 137. A U-shaped rod 152 has its inwardly turned free ends rotatably mounted within caps 150, 151 and is bent so as to pass around post members 136, 137 as shown in FIG. 15. Rod 152 can thus pivot in caps 150, 151 and can be raised to a position above rounded portions 146, 147 of the two post members 136, 137. The table itself is composed of two sections. Table sections 155, 156 are closely hinged together at a pair of adjoining edges by a piano hinge 157 which allows sections 155, 156 to fold up so that their top surfaces are brought together. Top section 155 has on its bottom side a pair of integrally secured caps 158, 159 similar to caps 150, 151. Rod 152 passes through caps 158, 159 in a pivotal relation. The width of the pair of table sections 155, 156 is selected to allow for their being folded so as to reside in the recessed area formed by post members 136, 137 as seen in FIG. 17. In this folding operation, the inside surfaces of the rounded portions 146, 147 act as stops and prevent table section 155 from sliding on rod 152 beyond their respective positions. As can be seen in FIG. 15, as table section 155 is allowed to pivot back toward inside wall 17a, table section 156 is being folded upward until its top surface rests against the top surface of section 155. Section 155 is removed by snapping rod 152 from caps 150, 151.

Figure 16:
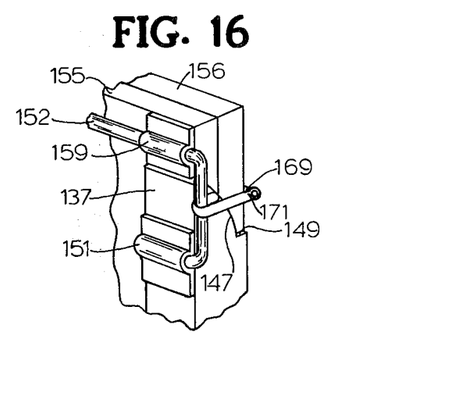
FIG. 16 is an enlarged, fragmentary pictorial view of the means utilized for retaining the folded table in an upright position against the truck cab back.

FIG. 16 further illustrates how rod 152 is raised and sections 155, 156 are allowed to fold together and reside between support members 136, 137. It can also be seen that when allowed to unfold, rod 152 rests on notches 149 and prevents further downward travel of the inner supported end of section 155. As sections 155, 156 are more fully opened up, a pair of appended legs 160, 161 are rotated downward into a position adjacent the truck bed. Legs 160, 161 are maintained in a locked downward position by bracing rods 162, 163 respectively. Legs 160, 161 are pivotally secured respectively to sections 155, 156 by means of hinges 155a, 155b and 156a, 156b.

Bracing rods 162, 163 are employed with the table structure and are similar in construction to the bracing rods 104, 105, 106 used with the seat/bed structure 10. Bracing rod 162, illustrated in FIG. 18, has a bent end portion 164 which is received by a hole in a support channel 166 secured to section 155. This end of rod 162 snaps into the hole in channel 166, to hold leg 160 in a supporting position. During storage, bend 167 in rod 162 holds leg 160 in a closed or unfolded position by snapping into the slot 168 formed in channel 166. Whenever section 155 is being opened, rod 162 and specifically bent portion 164 slide along within slot 168 until it aligns with the hole at which time it snaps into the hole and provides rigidity for leg 160. While only leg 160 and rod 162 has been described, it should be understood that leg 161 and rod 163 are constructed and operate in the same manner. Structure 135 is removed by snapping rod 152 from caps 150, 151.

FIG. 17 illustrates foldable table structure 135 in a folded relation with a flexible strap 160 retaining table sections 155, 156 in a vertical folded relation against inside back wall 17a. FIG. 16 further illustrates how flexible strap 169 has hooks 170, 171 which hook over a portion of rod 152 at each side and effectively holds sections 155, 156 in place. When in a folded position, rod 152 is substantially vertical with the back of post members 136, 137, see FIG. 16. In order to unfold table structure 135, strap 169 must be released from one side, at which time rod 152 will pivot forward so that it rests on notched surfaces 148, 149. With table section 156 still folded against section 155, section 155 is raised and leg 160 lowered and bracing rod 162 slid into locking position. Next, table section 156 is rotated away from section 155 until it is in the same plane as section 155 after which leg 161 is lowered and rod 163 is locked into place. The reverse of the procedure will place table structure 135 in an out-of-the-way folded position against inside backwall 17a, as previously explained.

In summary, it can be seen that the invention enables either a single or pair of seat/bed frame structures to be employed with a pickup truck, or the like, for both seat and bed accommodations. The seating accommodations, as previously described, can be either with the backrest upright or in an inclined position for greater comfort. For normal use, the seat/bed structures are completely removable and the permanent support structure can be disposed, i.e., the support posts can be folded, so that the truck is left in a condition for its normal purposes. The cooperative folding table provides an additional eating accommodation with the width and length of the table surface being proportioned to accommodate to the seat/bed units in a seating position. As with the seat/bed units, the folding table unit can also be removed from its supporting posts which means that neither the seat/bed units nor the table unit interfere with normal truck usage.

While specifically described in relation to the typical pickup truck structure, it will be appreciated that the invention also finds utility in campers and other types of trucks and vehicles having inside wall surfaces from which the seat/bed units and table unit can be supported.

What is claimed is:

1. A seat/bed assembly usable singly and in pairs and selectively foldable for use as a seat or bed in a pickup truck, camper, and like vehicle having opposed upright sidewalls and a floor between the sidewalls, each such assembly comprising:
   a. support means providing a pair of laterally spaced, vertical tubular guide members secured to a selected sidewall of the vehicle;
   b. a first rectangular frame member having a supportive surface and having mounted adjacent one side edge thereof a pair of guide connectors adapted to travel on said guide members adapting the said side edge of said first frame member to be retained and move vertically thereon and said frame member to pivot thereon for assuming selected stored and seat back positions in which said first frame member side edge is elevated on said guide members and said supportive surface is brought to an upright, outwardly facing position and when desired a bed position in which said first frame member side edge is lowered on said guide members and said supportive surface is upwardly facing and disposed horizontally;
   c. a second rectangular frame member having a supportive surface and hinge means hingedly connecting one of its side edges to the other side edge of said first frame member for pivoting between an unfolded position in which the supportive surface thereof is horizontal and facing upwardly for use as a seat or bed surface and another folded position in which the supportive surface thereof is brought to an upright position facing the supportive surface of the first frame member for storage; and
   d. folding leg means connected to said second frame member to support the same on the floor of the vehicle when in its said unfolded seat and bed positions, said folding leg means including at least one pair of leg means extending perpendicular to the side and each member of the pair of being at the same distance longitudinally from an end of the floor and having one member of the pair adapted to be folded to accommodate to tire well intrusions, and the like, when said second frame member assumes its seat position and adapted to be unfolded adjacent the other member of the pair to supplement the support provided thereby when said second frame member is in its bed position.

2. An assembly as claimed in claim 1 wherein said hinge means provide pivotal connections offset inwardly from said supportive surfaces being adapted to maintain said hingedly connected edges laterally spaced for storage of cushions between said surfaces when said frames are in the stored positions, to allow said hingedly connected edges of said frames to be positioned at different elevations when said frames are in said respective back and seat positions and to allow said hingedly connected edges to abut when said frames are in said bed position.

3. An assembly as claimed in claim 1 wherein said tubular guide members comprise U-channel section posts and said guide connectors comprise rollers mounted adjacent said first frame side edge and adopted to roll within the channel sections of said posts.

4. An assembly as claimed in claim 3 wherein said first frame member includes an outwardly projecting pin member on each end edge thereof and spaced from said one side edge and adapted to slide within the said channel sections of said posts during vertical travel of said first frame member thereon, said channel post members each being formed with openings at a lower elevation adapted to allow said pin members to leave said channel post members and said first frame member to pivot on said rollers when said first frame member is desired to be disposed in inclined seating and bed positions.

5. An assembly as claimed in claim 4 including linkage means mounted on said post members and adapted to engage and secure such pin members when said first frame member is in a selected inclined seating position.

6. A pair of assemblies as claimed in claim 1, one of such assemblies having its said support means on one said sidewall, and the other assembly of the pair having its support means on the opposite said sidewall and being arranged such that the respective outer edges of the respective second frame members of each assembly come into close contiguous relation when said frames are in said bed position.

7. A seat/bed assembly as claimed in claim 6 including in association therewith a folding table assembly for use in such a vehicle having a back wall between the sidewalls, said folding table assembly comprising:
   a. a pair of laterally spaced vertical table support post members secured to the back wall of the vehicle;
   b. a first rectangular table frame member having a table surface and hinge means hingedly connecting one end edge thereof to the top ends of said table support post members and being movable between a vertical storage position in which said first table frame member is adapted to be stored adjacent said table support post members and out of the operating paths of said seat/bed assembly frame members and a horizontal position in which said table surface faces upwardly and is disposed horizontally at a selected elevation corresponding to use for eating, and the like, and above the elevation assumed by said pair of seat/bed assembly second frame supportive surfaces when in their seat positions;
   c. a second rectangular table frame member having a table surface and being hingedly connected at one end edge thereof to the other end edge of said first table frame member and being movable between a vertical storage position in which said second table frame member is adapted to be stored adjacent said first table support post member with said table surfaces facing, and out of the operating paths of said seat/bed assembly frame members and a horizontal position in which said second table frame member surface faces upwardly and is disposed horizontally and coplanar with said first table frame surface and with the connected end edges thereof in abutting relationship; and
   d. leg means pivotally secured to said first and second table frame means and adapted to be folded for storage adjacent said table frame surfaces and unfolded to support said table frames on the floor of the vehicle.

8. An assembly as claimed in claim 7 wherein said first table frame member hinge means include a hinge link adjacent each said table support post member having at one end a pivotal connection on the table support post member and at the opposite end a pivotal connection on the first table frame member and wherein said table support members are formed to allow said links to engage and rest on said table support members to support said first table frame member in its horizontal position.

9. An assembly as claimed in claim 7 wherein the width and length of said first and second table frame members are selected such as to allow said pair of seat/bed assemblies to be opened to their seat positions and said table assembly to be used therebetween.

10. An assembly as claimed in claim 8 wherein said table post members are formed of structural angle strip material and said first table frame member is adapted to rest therebetween during said storage.

11. An assembly as claimed in claim 1 wherein said guide connectors are arranged to be removed from said guide members by lifting said first frame member thereby enabling said first and second frame members of said assembly to be completely unsecured from said support means and removed from said vehicle.

* * * * *

UNITED STATES PATENT OFFICE
CERTIFICATE OF CORRECTION

Patent No. 4,005,898  Dated Feb. 1, 1977

Inventor(s) Lee V. Way

It is certified that error appears in the above-identified patent and that said Letters Patent are hereby corrected as shown below:

Col. 1, line 55, "structures" should be --structure--.

Col. 2, line 43, "bck" should be --back--.

Col. 6, line 61, --back-- should be inserted after "rotated".

Col. 8, line 27, "160" should be --169--.

Col. 9, line 42, the second appearance of "of" should be deleted.

Col. 10, line 65, "include" should be --includes--.

Signed and Sealed this

Fifth Day of April 1977

[SEAL]

Attest:

RUTH C. MASON
*Attesting Officer*

C. MARSHALL DANN
*Commissioner of Patents and Trademarks*